United States Patent
Cho et al.

(10) Patent No.: US 9,481,484 B2
(45) Date of Patent: Nov. 1, 2016

(54) TWO-COMPONENT HYBRID LABELING SYSTEM FOR USE IN REPEAT LABELING

(71) Applicant: NuLabel Technologies, Inc., East Providence, RI (US)

(72) Inventors: Daniel Y. Cho, Pawtucket, RI (US); Ashley M. Mudd, Providence, RI (US); David A. Sonshine, Stamford, CT (US)

(73) Assignee: NuLabel Technologies, Inc., East Providence, RI (US)

( * ) Notice: Subject to any disclaimer, the term of this patent is extended or adjusted under 35 U.S.C. 154(b) by 28 days.

(21) Appl. No.: 14/025,544

(22) Filed: Sep. 12, 2013

(65) Prior Publication Data
US 2014/0072748 A1      Mar. 13, 2014

Related U.S. Application Data

(60) Provisional application No. 61/699,923, filed on Sep. 12, 2012.

(51) Int. Cl.
*G09F 3/10* (2006.01)
*B65C 9/00* (2006.01)
(Continued)

(52) U.S. Cl.
CPC . *B65C 9/00* (2013.01); *B65C 1/00* (2013.01); *C09J 7/0296* (2013.01); *G09F 3/04* (2013.01); *G09F 3/10* (2013.01); *B65C 2009/0059* (2013.01); *C09J 2203/334* (2013.01); *Y10T 156/10* (2015.01); *Y10T 428/14* (2015.01)

(58) Field of Classification Search
USPC .................................................. 40/594, 638
See application file for complete search history.

(56) References Cited

U.S. PATENT DOCUMENTS 3,165,490 A * 1/1965 Uno ...................... C08K 5/175
                                                    260/DIG. 19
3,289,386 A   12/1966 Farmer
(Continued)

FOREIGN PATENT DOCUMENTS

EP   1783059   5/2007
EP   2361760   8/2011
(Continued)

OTHER PUBLICATIONS

Breard, "Hanging on through thick and thin: A look at static-cling vinyls", Screenprinting Magazine, pp. 1-9, Mar. 2005.
(Continued)

*Primary Examiner* — Joanne Silbermann
(74) *Attorney, Agent, or Firm* — Pabst Patent Group LLP

(57) ABSTRACT

A reusable, liner-free labeling system, which allows labels to be wound without the use of a release liner, is described herein. The absence of a liner reduces inventory requirements, roll-changeover time, cost of production, and waste. Additionally, the labeling system described herein provides labels that remove cleanly, which reduces the time required to remove the label and eliminates the necessity of cleaning the substrate after removal. The labeling system provides labels that can be easily reused and reapplied, which can reduce time and costs associated with user labeling error. The labeling system is compatible with labels of all currently available facesheets, regardless of composition or physical characteristics, and allows for large quantity batch printing. The implementation of the labeling system does not require any changes to the pre-existing label printing infrastructure.

22 Claims, 1 Drawing Sheet

(51) Int. Cl.
*G09F 3/04* (2006.01)
*C09J 7/02* (2006.01)
*B65C 1/00* (2006.01)

(56) References Cited

U.S. PATENT DOCUMENTS

| | | | |
|---|---|---|---|
| 3,531,316 | A | 9/1970 | Sternasty |
| 4,334,431 | A | 6/1982 | Kohno |
| 4,519,095 | A | 5/1985 | Clayton |
| 5,089,320 | A | 2/1992 | Straus |
| 5,162,138 | A | 11/1992 | Caflisch |
| 5,334,431 | A * | 8/1994 | Longtin ............... 428/41.8 |
| 5,403,025 | A | 4/1995 | Shanley |
| 5,417,790 | A | 5/1995 | Petrou |
| 5,628,858 | A * | 5/1997 | Petrou ................ 156/249 |
| 5,656,369 | A * | 8/1997 | Chess ............. B42D 5/027 428/331 |
| 6,020,062 | A | 2/2000 | Questel |
| 6,054,006 | A | 4/2000 | Pilon |
| 6,210,795 | B1 | 4/2001 | Nelson |
| 6,298,894 | B1 | 10/2001 | Nagamoto |
| 6,306,242 | B1 | 10/2001 | Dronzek |
| 6,502,986 | B1 | 1/2003 | Bensur |
| 6,517,664 | B1 | 2/2003 | Dronzek, Jr. |
| 6,519,885 | B2 * | 2/2003 | Valiulis ............. 40/661.03 |
| 6,656,319 | B1 | 12/2003 | Boyd |
| 6,663,746 | B2 | 12/2003 | Dronzek |
| 6,667,086 | B2 * | 12/2003 | Dronzek, Jr. ............ 428/40.1 |
| 6,749,710 | B2 | 6/2004 | Preston |
| 6,854,189 | B2 * | 2/2005 | Schafer ............. B26B 29/06 33/1 B |
| 7,892,598 | B1 | 2/2011 | Dronzek |
| 7,943,714 | B2 | 5/2011 | Schnieders |
| 7,963,413 | B2 | 6/2011 | Sierra-Gomez |
| 8,091,323 | B2 | 1/2012 | Paterson |
| 8,334,335 | B2 | 12/2012 | Lux |
| 8,334,336 | B2 | 12/2012 | Lux |
| 2001/0037594 | A1 * | 11/2001 | Bohen ............... 40/594 |
| 2004/0221944 | A1 | 11/2004 | Havard |
| 2005/0277358 | A1 | 12/2005 | Isenberg |
| 2007/0232497 | A1 | 10/2007 | Chew |
| 2007/0248777 | A1 * | 10/2007 | Lee ............... C08J 5/18 428/34.1 |
| 2011/0033698 | A1 | 2/2011 | Woods |

FOREIGN PATENT DOCUMENTS

| | | |
|---|---|---|
| GB | 1333710 | 10/1973 |
| WO | 9734810 | 9/1997 |
| WO | 9919412 | 4/1999 |
| WO | 0214448 | 2/2002 |

OTHER PUBLICATIONS

International Search Report, in the corresponding PCT application PCT/US2013/059456, mailed Jan. 16, 2014.
Balzer, et al., "Cohesion mechanisms of polystyrene-based thin polymer films" Macromolecules, 46:7406-14 (2013).
Jin, et al., "Challenges and solutions for joining polymer materials," Macromol. Rapid Commun., 35:1551-70 (2014).
Randow, et al., "An investigation of the cling of thin polymeric films," J. Adhesion, 63: 285-307 (1997).
International Search Report, PCT application PCT/US2014/065278, mailed Feb. 20, 2015.

* cited by examiner

TWO-COMPONENT HYBRID LABELING SYSTEM FOR USE IN REPEAT LABELING

CROSS-REFERENCE TO RELATED APPLICATIONS

This application claims priority to U.S. Provisional Application Ser. No. 61/699,923 filed Sep. 12, 2011. The disclosure of U.S. Ser. No. 61/699,923 is herein incorporated by reference.

FIELD OF THE INVENTION

This invention is generally in the field of labeling systems and methods of making and using thereof, particularly labeling systems using reusable, liner-less labels.

BACKGROUND OF THE INVENTION

Containers for the transportation and storage of mechanical parts, components or other objects and shelf-markings may be of a fiber-based, metal, olefinic or other formed-plastic construction. A paper or polymer-based label, which designates relevant information of the container contents and shipping requirements or objects on the shelf are typically attached to such containers or shelves. After printing the label information, the labels are typically released from a liner at the time of application to the substrate, and adhere by means of a pressure sensitive adhesive coating. These labels are typically printed from conventional label printing devices, which require the adhesive side of the label stock to be laminated to the release liner. As these containers are typically re-purposed, the labels must be removed, which can be a difficult and time-consuming process, especially in large quantities, since the labels have high tack and can tear, which increases the cost and time associated with label removal. Also, the use of a release liner is a significant added expense and negative environmental impact with respect to production and elimination of waste.

Therefore, there exists a need for a label, which is easily removable and is reusable, which does not require a liner, and which can be used in conventional label printing devices.

Therefore, it is an object of the invention to provide a label, which is easily removable and is reusable, which does not require a liner, and which can be used in conventional label printing devices, and methods of making and using thereof.

SUMMARY OF THE INVENTION

A reusable, liner-free labeling system, which allows the labels to be wound without the use of a release liner, is described herein. The labeling system can include an anchoring site which can be a film of a polymeric or non-polymeric material, such as poly vinyl chloride, polyurethanes, neoprene, silicones, rubbers, polyethylene terephthalate, high and low density polyethylene, polyamide, polypropylene, polycarbonate, polyolefins, ethylene vinyl acetate, polystyrene, polyvinyl acetate, nitrile, and combinations thereof or a paper or film coated with a cling coating or film, such as poly vinyl chloride (PVC). The coating on the paper or film is typically a different material from the film or coating on the labels, however the coating materials can also be the same or similar. The anchoring site can be affixed to the substrate after manufacture or can be incorporated into the substrate during manufacture.

The label can be prepared from a variety of materials, including paper or polymeric materials. The label is coated with a material or materials, which temporarily attach to the anchoring site. Suitable materials include, but are not limited to, polyvinyl alcohols, polyvinyl acetates, polyvinylpyrrolidones, polyvinylpyrrolidone-vinyl acetate copolymers, polyacrylic acids, polyethylene glycols, poly(2-ethyl-2-oxazoline), polyacrylamide copolymers, ethylene vinyl acetates, natural and reclaimed rubbers, polyurethanes, non-carboxylated and carboxylated styrene-butadiene rubbers, polyacrylates based on the polymerization of monomers of methacrylates, methyl acrylate, ethyl acrylate, 2-chloroethyl vinyl ether, 2-ethylhexyl acrylate, hydroxyethyl methacrylate, butyl acrylate, butyl methacrylate or combinations of the previous, polyamides, polyesters, polyolefins, chlorinated-polyolefins, polyolefins containing maleic anhydride, polystyrenes, polyvinyl esters, polyvinyl ketones, polydiene elestomers, polyiso butylenes, poly butadienes, polychloroprenes, poly styrene acrylics, carboxylated acrylic, styrene and/or butadiene polymers, cellulose derivatives, particularly alkyl cellulose derivatives (cellulose acetate, methyl cellulose, ethyl/hydroxyethyl, hydroxymethylpropyl cellulose, etc.), ureas, gelatins, alginates, agars, gum arabics, as well as combinations of the above materials. In some embodiments, the coating material contains styrene acrylic polymers, ethylene acrylic polymers, neoprene, and combinations thereof.

In some embodiments, the label temporarily adheres to the anchoring site through the cohesive forces between smooth surfaces. "Temporary adheres" as used herein generally means that the label can be affixed for any period of time, e.g., less than one minute to greater than one year, removed undamaged, and placed in a new location or a new label attached to the same location on the anchoring site at any time point. The labels exhibit good peel strength, little or no transfer of the coating to the anchoring site, and good blocking resistance properties.

The absence of a liner reduces inventory requirements and roll-changeover time, as the absence of the liner increases the number of labels per roll, which reduces the total number of rolls required and decreases the number of roll-changes per label. The absence of a liner also reduces cost, as there is no longer a silicone-coated release liner, which is costly to produce and waste since the absence of the liner eliminates the need to discard used liners and reduces the negative environmental impacts of producing, shipping and eliminating liners in the labeling process. Additionally, labeling system described herein provides labels that remove cleanly, which reduces the time required to remove the label and eliminates the necessity of cleaning the substrate after removal to further reduce the time and cost associated with labeling substrates with currently existing technology. "Remove cleanly", as used herein, generally means that the anchoring site is free of debris and buildup and the cling coating is smooth and undisturbed as evaluated by visual inspection.

The labeling system provides labels that can be easily reused and reapplied, which can reduce time and costs associated with user labeling error. The labeling system is compatible with labels of all currently available facesheets, regardless of composition or physical characteristics, and allows for large quantity batch printing, wherein labels can be pre-printed on a large scale, stored, and later applied since the labels work via a cohesive rather than adhesive mechanism and have an unlimited open time. The implementation of the labeling system does not require any changes to the pre-existing label printing infrastructure.

DETAILED DESCRIPTION OF THE INVENTION

I. Definitions

Figure 1:
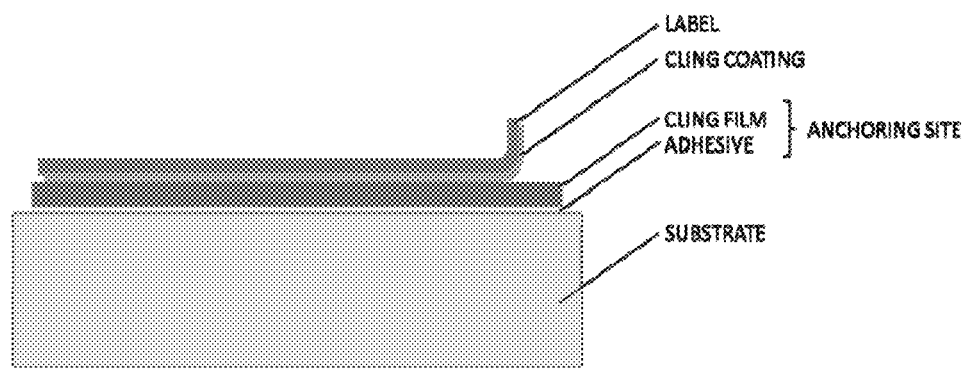
FIG. 1 is a schematic of a label with a cling coating applied to an anchoring site, which is permanently attached to the substrate to be labeled. The label with the cling coating can be reapplied to the anchoring site or another anchoring site or a new label can be applied to the anchoring site for re-labeling.
Figure 2:
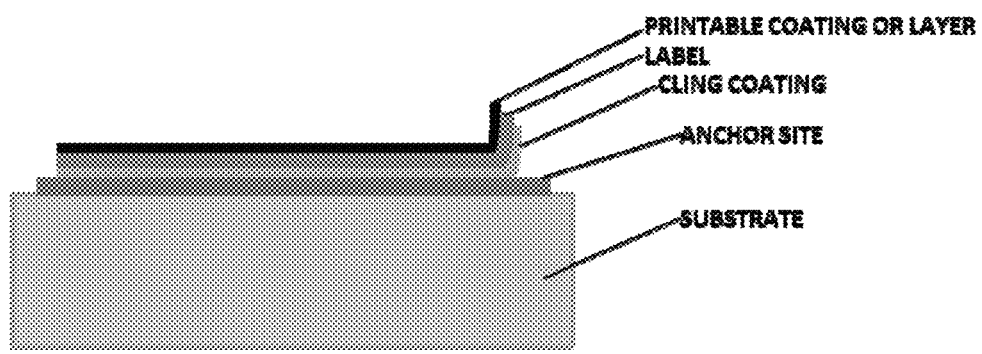
FIG. 2 is a schematic of a label with a cling coating applied to an anchoring site, which is permanently attached to the substrate to be labeled. The label with the cling coating can be reapplied to the anchoring site or another anchoring site or a new label can be applied to the anchoring site for re-labeling. The cling coating is applied to one side of the label and a printable coating or layer is applied to the other side.

"Adhesive", as used herein, refers to a compound or compounds that adhere or bond two items together.

"Temporary adhesive", as used herein, refers to an adhesive designed to repeatedly or easily stick and unstick. In some embodiments, the temporary adhesive may be a cling coating or film. In some embodiments, the labels are designed to be reapplied to 1 to 50 times or more while the anchor site is designed to be reusable from 1 to 500 times or for up to one year to 5 years of continuous use. "Easily" as used herein generally means that that the label adheres without additional pressure beyond hand application (i.e. no weighted rollers or mechanical devices needed) is require for properly affixed labels. Labels that easily unstick only require hand forces to remove, i.e. no scraping tools or other devices or chemicals needed to remove labels. The label remains intact and undamaged after removal.

"Pressure sensitive adhesive" (PSA) is a term known in the art used to designate a distinct category of permanent or temporary adhesives which in dry form (solvent/water free) are aggressively and permanently tacky at room temperature and that firmly adhere to a variety of dissimilar surfaces upon mere contact without the need of more than finger or hand pressure. These products require no activation by water, solvent, or heat in order to exert a strong adhesive holding force toward such materials as paper, plastic, glass, wood, cement, and metal. In some embodiments, the PSA has sufficient cohesive holding power and elastic nature so that it is essentially permanently affixes the anchoring site to the substrate.

"Cling coating" and "Cling film" are used interchangeably and refer to materials that attach to each other via cohesive forces between smooth surfaces. The film or coating can be impregnated with plasticizers to introduce the flexibility and pliability to the material required for its cling behavior in this form. Thus, these films are capable of sticking to smooth surfaces in a wide range of environmental conditions, such as variable temperatures and humidity levels.

"Blocking" refers to the formation of a strong physical interaction between the coating of the label and the top of the label when the label is in roll or stacked form.

"Open time" as used herein, refers to the amount of time between the activation of the adhesive and the application of the label to a substrate.

II. Labeling System

A liner-free labeling system, which allows labels to be wound without the use of a release liner, and to be used repeatedly, is described herein. The system described herein provides labels that remove cleanly, which reduces the time required to remove the label and eliminates the necessity of cleaning the substrate after removal of the label to remove residual adhesive. This further reduces the time and cost associated with labeling substrates with currently existing technology. The system also provides labels that can be easily reused and reapplied, which can reduce time and costs associated with user labeling error. The system is compatible with labels of all currently available facesheets, regardless of composition or physical characteristics. The implementation of the system does not require any changes to pre-existing label printing infrastructure, such as required aftermarket devices, allowing the use of conventional labeling hardware.

A. Anchoring Site/Substrate

The systems and methods of use thereof described herein include an anchoring site, which is permanently affixed to, or permanently incorporated into, the substrate. The anchoring site can be provided as a linered element with an adhesive coated on it with a liner. The linered anchor sites provide end users the ability to permanently affix the anchor site to a substrate i.e. HDPE tote. The adhesive is applied to the backside of the anchor site. With the anchor site permanently affixed, cling labels can be applied and reapplied over and over. Thus, the initial step of the use of this system would be the removal of the liner followed by the application of the cling film to the substrate. Instead of using thousands of linered-labels, the system described herein allows for the use of one linered cling film anchoring site with hundreds or thousands of liner-free labels.

In some embodiments, the anchoring site is affixed to the substrate after the substrate is manufactured but before the liner-less labels are applied. The anchoring site can be permanently affixed to the substrate using a variety of techniques in the art. In some embodiments, the anchoring site is permanently affixed to the substrate using an adhesive, such as a pressure sensitive adhesive, as shown in FIG. 1. "Pressure sensitive adhesive" (PSA) is a term known in the art used to designate a distinct category of temporary or permanent adhesives which in dry form (solvent/water free) are aggressively and permanently tacky at room temperature and that permanently adhere to a variety of dissimilar surfaces upon mere contact without the need of more than finger or hand pressure. These products require no activation by water, solvent, or heat in order to exert a strong adhesive holding force toward such materials as paper, plastic, glass, wood, cement, and metal. They have sufficient cohesive holding power and elastic nature so that they essentially permanently affix the anchoring site to the substrate in a variety of environmental conditions, hot and cold temperatures, varying humidity levels, etc. This is important for application such as storage containers and packaging materials, which are typically exposed to harsh environments, some times for extended periods of time. Suitable pressure sensitive adhesives include, but are not limited to, acrylics, styrene butadiene resin, rubbers, and silicones, optionally in combination with one or more additives, such as tackifying resins, plasticizers, oils, antioxidants, etc. and combinations thereof.

In another embodiment, the anchoring site is introduced into or onto the substrate during manufacture of the substrate. For example, an anchoring site can be introduced into a storage container or packaging material during manufacture. The anchoring site may include, at the time of manufacture, a film or coating to which the label will adhere or such a material may be applied to the site after the substrate is manufactured. In a specific embodiment, the anchoring site is an aqueous or solvent based coating that is introduced to a printed shipping envelope through a web coating technique, including, but not limited to gravure, reverse gravure, slot die, rod, knife-over-roll, flexographic, or offset coating.

In another embodiment, the anchoring site is mechanically fixed or fastened to the substrate. In yet another embodiment, the entire substrate can act as an anchoring site. This is particularly relevant to certain plastic parts, including, but not limited to those made of plasticized PVC.

The anchoring site typically includes a film or coating to which the reusable, liner-less label is applied. In some embodiments, the film or coating is a cling material. Contrary to the name, the label generally attaches to the anchor site not through the formation of a charge but rather through cohesive forces between two smooth surfaces. Suitable films or coatings include poly vinyl chloride (PVC), nylon, silicone, butyl rubber, ethylene propylene diene monomer rubber, viton rubber, neoprene rubber, polyurethane, and combinations thereof.

Generally, the cling nature of these films is derived from the impregnation of plasticizers into the films. Suitable plasticizers include, but are not limited to, phthalate plasticizers, such as DOP/DEHP (dioctyl phthalate and di-2-ethyl hexyl phthalate) and DBP (dibutyl phthalate) but these have been replaced by BBP (butyl benzyl phthalate) and DINP (diisononyl phthalate) because they are less volatile and migratory so less hazardous. Other plasticizers can also be used. Controlling migration of the plasticizer can vary the peel strength of the label affixed to the anchor site. For example, altering the molecular weight and/or modifying the steric bulk of functional groups on the plasticizer molecules can control the migration of the plasticizer. A higher molecular weight and/or the presence of bulky functional groups results in slow/less migration while a lower molecular weight and/or less bulky (or linear) groups result in a faster/higher degree of migration. Slow/less migration of plasticizer provides for more temporary label adhesion to the anchor site. Fast/high migration of plasticizer provides for more permanent label adhesion to the anchor site. Internal plasticizer refers to plasticizers covalently bonded to the polymer while external are added to the polymeric mixture but are not physically bonded to the polymer. Internal plasticizers have lower degree of migration than external plasticizers.

The anchoring site can be permanently affixed to, or incorporated into or onto, a variety of substrates manufactured from a variety of materials. In some embodiments, the substrate is prepared from paper or coated paper, cardboard or coated cardboard, plastic, glass, wood, cement, metal, or combinations thereof. In particular embodiments, the substrate, or the portion of the substrate, to which the anchoring site is affixed is plastic (e.g., PE, PET, etc.). In other embodiments, the substrate is formed from paper or cardboard or coated paper or cardboard. In yet another embodiment, the substrate is formed from Tyvek® or materials similar in construction to Tyvek®. In certain embodiments, the anchoring site can be manufactured into the desired substrate and be a permanent feature of said substrate. In other embodiments, the substrate can act as the anchoring site. This is particularly applicable to certain plasticized plastics, including, but not limited to, PVC.

In other embodiments, the anchoring site itself can be removable. This is particularly relevant in the manufacture of parts and assemblies that require multiple manufacturing steps and processes. In these systems, different labels may be applied to and removed from said assembly during multiple manufacturing steps. Once the assembly is complete, the final label and anchoring site can be readily removed. The anchor site film thickness range is 0.001" to 0.200", preferred range is 0.015" to 0.100" and most preferred range is 0.020" to 0.050".

B. Coated Labels

The system also includes one or more reusable, liner-less labels. The labels can be made from a variety of substances, such as paper or polymeric films. Suitable facestocks include, but are not limited to, paper, top-coated and non-top-coated grades of direct thermal paper, polymer films, woven and non-woven synthetic materials, wood, metal films, composites, and combinations thereof.

The label is coated with one or more materials, which temporarily attach the label to the anchor site. In some embodiments, the labels are coated with a cling film or coating which temporarily attaches the label to the anchor site. The label can attach to the anchor site via cohesive forces between the smooth anchor site and the smooth label. The label could also be a plasticized polymeric film (similar or identical material to the anchoring site) that is printed with the label information as well. In a preferred embodiment, the label is as described above but other types of cling films can also be used.

Suitable coatings materials include, but are not limited to, polyvinyl alcohols, polyvinyl acetates, polyvinylpyrrolidones, polyvinylpyrrolidone-vinyl acetate copolymers, polyacrylic acids, polyethylene glycols, poly(2-ethyl-2-oxazoline), polyacrylamide copolymers, ethylene vinyl acetates, natural and reclaimed rubbers, polyurethanes, non-carboxylated and carboxylated styrene-butadiene rubbers, polyacrylates based on the polymerization of monomers of methacrylates, methyl acrylate, ethyl acrylate, 2-chloroethyl vinyl ether, 2-ethylhexyl acrylate, hydroxyethyl methacrylate, butyl acrylate, butyl methacrylate or combinations of the previous, polyamides, polyesters, polyolefins, chlorinated-polyolefins, polyolefins containing maleic anhydride, polystyrenes, polyvinyl esters, polyvinyl ketones, polydiene elastomers, polyiso butylenes, poly butadienes, polychloroprenes, poly styrene acrylics, carboxylated acrylic, styrene and/or butadiene polymers, cellulose derivatives, particularly alkyl cellulose derivatives (cellulose acetate, methyl cellulose, ethyl/hydroxyethyl, hydroxymethylpropyl cellulose, etc.), ureas, gelatins, alginates, agars, gum arabics, as well as combinations of the above materials.

The coating weight can be varied depending on the material to be coated and the substrate. In some embodiments, the coat weight is from about 3-10 lbs/3000 sq. ft., such as about 7 lbs/3000 sq. ft. However, on polymeric films, the coat weight can be significantly lower than 7 lbs/3000 sq. ft., or as low as 1 lb/3000 sq. ft. On paper facesheets, a higher coat weight is needed to obtain a smooth film on the surface.

The cling coating should be smooth and allow for cohesive interactions with the anchoring site. For the styrene acrylic type formulations, the ability of the coating material to form a smooth, hard film that the PVC can interact is likely important for the label to attach to the anchoring site. Thus, specific coating and anchoring site pairs can be developed for this system. For materials like neoprene or in embodiments in which a plasticized PVC film is used as the label as well, the cohesive/soft nature of these materials should be considered.

In some embodiments, the cling coating contains a styrene acrylic having a glass transition temperature from about −20° C. to about 80° C. and an acid number from about 50 mg KOH/g polymer to about 210 mg KOH/g polymer, preferably from about 50 mg KOH/g polymer to about 205 mg KOH/g polymer. The molecular weight of the polymer can vary but is typically greater than about 100,000 Daltons, 150,000 Daltons, 200,000 Daltons, 250,000 Daltons, or 300,000 Daltons.

In particular embodiments, the coating material contains a blend of a styrene acrylic with an ethylene acrylic acid. In other embodiments, the coating materials contain a blend of two or more styrene acrylics in combination with an ethylene acrylic acid polymer. In particular embodiments, the coating materials contains styrene acrylic 2, 4, 5, 7, or 9 in Table 1, alone or in combination with a second styrene acrylic 1, 2, 5, 7, or 9 in Table 1, and optionally in combination with a third component, such as neoprene. In some embodiments, the coating material contains a mixture of only styrene acrylics.

The amount of the various components can vary. However, in some embodiments, the amount of the styrene acrylic polymer(s) is at least about 40, 45, 50, 55, 60, 65, 70, 75, 80, 85, or 90% by weight of the composition. In those embodiments containing neoprene, neoprene is generally present in an amount less than about 40, 35, 30, 25, 20, 15, or 10% by weight of the composition. In other embodiments, the coating material contains about 100% of styrene acrylic(s).

In other embodiments, the labeling system contains a PVC film anchoring site with a label that consists of the same film (i.e. PVC on PVC).

The cling coating can also contain one or more additives. Suitable additives include, but are not limited to, acids, bases, buffers, antimicrobial agents, stabilizers, emulsifiers, and/or defoaming agents, as needed for the particular application. Potential classes of additives include, but are not limited to, colorants, both dye and pigment based, salts, sugars, other carbohydrates, polyelectrolytes, proteins, dry and liquid surfactants, resins, wetting agents, additive that provide desired lay flat properties of the labels, such as humectants, polyethylene glycol, and/or salts, other similar materials as well as combinations thereof.

In some embodiments, the coating is impregnated with one or more plasticizers to flexibility and pliability to the coating. Suitable plasticizers include, but are not limited to, phthalates, benzoates, polyols, polyol polyethers, diols, citrates, phosphates, adipates, azellates, trimellitates, and combinations thereof.

C. Properties of the Labeling System

The labeling system described herein is advantageous because it can be used with existing conventional labeling hardware; the labeling system does not require an aftermarket device or special equipment. The labeling system described herein maintains its integrity in varying environmental conditions, such as hot and cold temperatures and different humidity levels.

The label itself should have a peel strength sufficient to ensure that the label does not readily fall off the anchor site but requires some strength to remove the label from the anchoring site. In some embodiments, the peel strength is greater than 25, 50, 75, 100, 125, 150, 175, or 200 g/in.

In Table 2 below, peel strength is characterized as none (no attachment to the anchor site), poor (some attachment but readily detaches or is easily detached from the anchor site; <20 g/in), fair (21 to 100 g/in), good (sufficient cohesion to remain attached to the PVC overnight with some strength required to remove the label; 101 to 200 g/in), or excellent (attachment to the PVC overnight with strong peel strength upon removal, typically greater than 200 g/in). The peel strength is measured quantitatively using a modified ASTM D3330 method. This is a modified method as the peel strength of the label adhered to the anchor site is measured as opposed to adhesion to a stainless steel standard as in the ASTM method. It is also modified because D3330 is for PSA tape.

In one embodiment, the label is reusable and therefore cannot transfer adhesive from the label to the anchor site. In Table 2 below, transfer was evaluated visually. Transfer is characterized as none (no visual evidence of adhesive transfer), slight (<15% of the surface area transferred), moderate, heavy (complete coating transfer), or paper tear (facesheet tore during the removal of the label).

The labels must also exhibit excellent blocking resistant properties. Blocking is a measurement of bond formation between the coatings of the label and the top of the label when the label is in roll or stacked form.

As described in Example 1 and Table 2. The force required to separate the two strips of paper was evaluated to give a blocking rating of excellent, good, fair and poor. An excellent indicates that the two strips fell apart by themselves suggesting that the coating exhibits no blocking. A rating of good indicates very slight blocking while a score of poor is given to samples that result in paper tear at peeling.

Formulations 13, 17-19, 24, 25, 30, and 32 in Table 2 exhibited good or excellent blocking properties, none or slight adhesive transfer, and good or excellent peel strength. Other formulations exhibited good blocking properties and excellent peel strength with moderate adhesive transfer (see, for example, formulations 23, 28, and 29).

III. Methods of Making

The labels can be coated with the cling coating or film using techniques known in the art. For example, cling formulations can be coated onto a film facesheet using a Mayer rod bar coater with a target coat weight of 7 lb/3000 sq. ft. The coat weight can vary depending on the formulation and film facesheet.

The cling coating can be applied to the above listed facestocks utilizing typical web coating methods including, but not limited to, knife-over-roll, gravure, reverse-gravure, metering rod, slot die, and air knife coating methods.

The coat weight of the adhesive composition on the facestock is largely dependent upon morphology of the coating upon drying; a smooth surface must be presented to the anchoring site to maximize the surface area for cling. To reduce cost, coat weights of 1.5 lb/3000 sq. ft. are typically used. However, coat weights up to 15 lb/3000 sq. ft. may also be used.

After the application of the cling composition to the facestock web, the remaining water and solvent is extracted from the cling composition. This may be accomplished using conventional methods including, but not limited to, air flotation oven, web over rollers oven, energy cure methods, and the like.

Optionally, it may be desirable to coat thermally activated paper and films. Care must be taken in cling coating composition selection to ensure that the components formulating the cling coating composition do not contain certain chemistries or solvents that negatively interact with the embedded thermal dye. In addition, during the drying (or solvent removal) process, the heat or energy from the process should not activate the thermal paper (a processes known as imaging).

Sometimes the coating of a web with a cling coating can induce a phenomenon known as a shape memory or curling. As it is often important for end applications that labels have lay flat properties, a number of additives can be added to the cling coating formulation to prevent curl, as described earlier. In addition, mechanical methods can be employed to reduce curl. Also, the addition of vaporized water (or other liquid vapors) to the non-cling coated side of the label can have dramatic effects in reducing curl.

Other methods could include the lamination of a cling film onto the label as well as hot melt, solvent coating, etc.

In those embodiments where an anchoring site is provided with the labels, the anchoring site can be pre-treated with an adhesive, such as a pressure sensitive adhesive, to permanently affix the anchor site to the substrate. The anchoring site can be coated using techniques known in the art. Once the anchor site is affixed, it should semi-permanently adhere to the substrate and serve as an adhesive surface for multiple labels over an extended period of time. In some embodiments, the period of time is 1 day to 5 years, preferably 6 months to 5 years, more preferably 1 year to 5 years. In other embodiments, the time period is 1 day to 12 months, and most preferable 1 week to 6 months.

IV. Applications

The labeling system described herein can be used for any application in which reusable labels are required or desired. The labeling system can be applied to a substrate, such as an article of manufacture. In one embodiment, the labels are applied to storage containers for parts required in different manufacturing applications. For example, the labels can be used to label containers for storing automotive parts, electrical parts, etc. The storage containers are reused and the ability to remove a label and introduce a new label describing the parts currently stored in the container is paramount. In addition, labels may provide logistically oriented information including identification barcode(s), expiration date(s), shipping destination(s), and assembly instruction(s). These containers are subject to varying environmental conditions, such as changing temperature and humidity such that the label must adhere in these varying conditions. The label must also not be removed due to the contact between containers.

In other embodiments, the label system can be used with packaging materials, including disposable packaging materials, such as shipping envelopes or boxes. As with storage containers, packaging materials are subject to varying environmental conditions, such as changing temperature and humidity such that the label must adhere in these varying conditions. The label must also not be removed due to contact between packaging materials, which is common as they are shipped from one location to another.

In yet another embodiment, the label system can be used with shelving material in either a commercial or retail environment. In such environments, shelf labels are used to identify contents and provide individuals with information or a barcode, pertaining to the objects or containers on the shelf. The labeling system should be stable to changing environmental conditions, such as temperature, humidity, etc. "Stable", as used herein, generally means the label remains adhered and in place under various environmental conditions.

In an additional embodiment, the label system can be used to provide a durable permanent or removable label to difficult to adhere to substrates and/or substrates that are typically exposed to harsh conditions. In this instance, difficult to adhere to substrates may include low surface energy plastics or dirty or dusty substrates. These substrates present challenges, mainly low adhesive peel strengths, to traditional pressure sensitive adhesive that are overcome with the proposed labeling system. For shelf-marking systems, harsh conditions include cold (e.g., refrigerator and freezers) as well as high temperature exposure (e.g., heat lamps or close proximity to ovens).

The labeling system provides labels that can be easily reused and reapplied, which can reduce time and costs associated with user labeling error. The labeling system is compatible with labels of all currently available facesheets, regardless of composition or physical characteristics, and allows for large quantity batch printing, wherein labels can be pre-printed on a large scale and stored, or printed on demand, and later applied since the labels work via a cohesive rather than adhesive mechanism and have an unlimited open time. The implementation of the labeling system does not require any changes to the pre-existing label printing infrastructure.

The absence of a liner reduces inventory requirements and roll-changeover time, as the absence of the liner increases the number of labels per roll, which reduces the total number of rolls required and decreases the number of roll-changes per label. The absence of a liner also reduces cost, as there is no longer a silicone-coated release liner, which is costly to produce and waste since the absence of the liner eliminates the need to discard used liners and reduces the negative environmental impacts of producing, shipping and eliminating liners in the labeling process.

EXAMPLES

Example 1

Preparation and Testing of Labeling Systems

Sample Preparation

Cling formulations were coated onto bi-axially oriented polypropylene (BOPP) film facesheet using a Meyer rod bar coater with a target coat weight of 7 lb/3000 sq. ft. The coated facesheets were air dried at 100° F. for 5 minutes. Labels were allowed to condition at room temperature in ambient humidity overnight prior to testing.

Blocking

Heat Seal Blocking

Labels were cut into 1.5"×6" strips and placed on top of the top coated side of the facesheet. The sample was compressed for 90 seconds under 60 psi of pressure at 120° F., n=2. The force required to separate the two strips of paper was evaluated to give a blocking rating of excellent, good, fair and poor. An excellent indicates that the two strips fell apart by themselves suggesting that the coating exhibits no blocking. A rating of good indicates very slight blocking while a score of poor is given to samples that result in paper tear at peeling.

Adhesion

Peel Testing

Labels were cut into 1"×6" strips and applied to a sheet of plasticized poly vinyl chloride (PVC) cling film, perpendicular to the ground. Peel strengths were tested at 24 hours and rated as none, poor, good, excellent, n=2 in Table 2. A rating of none indicates no attachment at all suggesting the label readily falls off the PVC after application. A score of good indicates sufficient cohesion to remain attached to the PVC overnight with some strength required to remove the label. A rating of excellent indicates attachment to the PVC overnight with strong peel strength upon removal, typically greater than 200 g/in. In Table 3, quantitative peel strength values were measured with modified ASTM D3330 method. Anchor sites were affixed to glass slides and the peel strength of the cling coated labels were measured at 180°. The peel strength values shown in Table 3 were measured 24 hours following label application.

The degree of cling coating from the label to the PVC film was determined visually. Samples with no transfer had no coating residue on the PVC after sample removal while slight transfer represents <15% of the surface area transferred. Heavy transfer represents complete coating transfer to the PVC. Paper tear was used to denote samples in which the facesheet tore during the removal of the label.

The properties of the materials used to prepare the samples that were tested are shown in Table 1.

TABLE 1

Properties of materials used to prepare samples.

| ID | General Chemistry | Melt Point (° C.) | Tg (° C.) | Acid # | Particle Size (nm) | MW (Da) | Other |
|---|---|---|---|---|---|---|---|
| 1 | Acrylic | | 52 | | 80 +/− 15 | | |
| 2 | Styrene Acrylic | | 98 | 50 | | >200,000 | |
| 3 | Styrene Acrylic | | 64 | 53 | | >200,000 | |
| 4 | Styrene Acrylic | | 27 | 203 | | | |
| 5 | Styrene Acrylic | | 75 | 50 | | >200,000 | |
| 6 | Styrene Acrylic | | −18 | 52 | | >200,000 | |
| 7 | Styrene Acrylic | | 13 | 45 | | >200,000 | |
| 8 | Styrene Acrylic | | 16 | 170 | | >200,000 | |
| 9 | Styrene Acrylic | | ND | 90 | | >200,000 | self cross-linking |
| 10 | Ethylene Acrylic Acid | 75 | | | | | modified ethylene acrylic acid |
| 11 | Neoprene | | | | | | moderate crystallization rate |
| 12 | Neoprene | | | | | | very slow crystallization rate |

The compositions of the film and the results of the assays described above are shown in Table 2.

TABLE 2

Compositions and results of adhesive films

| Formulation | Component 1 ID | % | Component 2 ID | % | Component 3 ID | % | Peel Strength | Transfer | Blocking |
|---|---|---|---|---|---|---|---|---|---|
| 1 | 2 | 90 | 10 | 10 | — | — | None | N/A | Excellent |
| 2 | 3 | 90 | 10 | 10 | — | — | None | N/A | Good |
| 3 | 4 | 90 | 10 | 10 | — | — | None | N/A | Excellent |
| 4 | 5 | 90 | 10 | 10 | — | — | None | N/A | Excellent |
| 5 | 6 | 90 | 10 | 10 | — | — | Excellent | Paper Tear | Fair |
| 6 | 7 | 90 | 10 | 10 | — | — | Excellent | Paper Tear | Good |
| 7 | 8 | 90 | 10 | 10 | — | — | Poor | None | Good |
| 8 | 9 | 90 | 10 | 10 | — | — | Poor | None | Good |
| 9 | 11 | 100 | — | — | — | — | Excellent | Heavy | Poor |
| 10 | 12 | 100 | — | — | — | — | Excellent | Heavy | Poor |
| 11 | 2 | 90 | 11 | 10 | — | — | None | N/A | Excellent |
| 12 | 2 | 90 | 12 | 10 | — | — | None | N/A | Excellent |
| 13 | 5 | 45 | 7 | 45 | 10 | 10 | Good | None | Excellent |
| 14 | 2 | 45 | 7 | 45 | 10 | 10 | Fair | None | Excellent |
| 15 | 4 | 45 | 7 | 45 | 10 | 10 | None | None | Excellent |
| 16 | 9 | 45 | 7 | 45 | 10 | 10 | Fair | None | Excellent |
| 17 | 7 | 45 | 5 | 45 | 10 | 10 | Good | Slight | Excellent |
| 18 | 7 | 55 | 5 | 35 | 10 | 10 | Good | Slight | Excellent |
| 19 | 7 | 65 | 5 | 25 | 10 | 10 | Excellent | Slight | Excellent |
| 20 | 7 | 75 | 5 | 12 | 10 | 10 | Excellent | Moderate | Good |
| 21 | 7 | 55 | 1 | 35 | 10 | 10 | Fair | Moderate | Good |
| 22 | 7 | 65 | 1 | 25 | 10 | 10 | Fair | Moderate | Good |
| 23 | 7 | 75 | 1 | 15 | 10 | 10 | Good | Moderate | Good |
| 24 | 7 | 70 | 5 | 30 | — | — | Good | None | Good |
| 25 | 7 | 70 | 2 | 30 | — | — | Good | Slight | Good |
| 26 | 7 | 70 | 10 | 30 | — | — | Good | Moderate | Good |
| 27 | 7 | 70 | 1 | 30 | — | — | Excellent | Moderate | Good |
| 28 | 7 | 100 | — | — | — | — | Excellent | Moderate | Good |
| 29 | 7 | 70 | 2 | 30 | — | — | Excellent | Moderate | Good |
| 30 | 7 | 70 | 9 | 30 | — | — | Excellent | None | Good |
| 31 | 7 | 50 | 2 | 50 | — | — | Good | Moderate | Good |
| 32 | 7 | 50 | 9 | 50 | — | — | Excellent | None | Good |

TABLE 3

Quantitative Adhesion Results

| Formulation | Component 1 ID | % | Component 2 ID | % | Component 3 ID | % | Coat Weight (lb/3000 ft²) | Peel Strength (g/in) |
|---|---|---|---|---|---|---|---|---|
| 6 | 7 | 90 | 10 | 10 | | | 7.5 | 1057.8917 |
| 7 | 8 | 90 | 10 | 10 | | | 7.0 | 2.7985 |
| 8 | 9 | 90 | 10 | 10 | | | 7.3 | 15.0000 |
| 13 | 5 | 45 | 7 | 45 | 10 | 10 | 7.5 | 30.1679 |
| 14 | 2 | 45 | 7 | 45 | 10 | 10 | 7.4 | 24.3470 |
| 16 | 9 | 45 | 7 | 45 | 10 | 10 | 7.1 | 25.5224 |

TABLE 3-continued

Quantitative Adhesion Results

| Formulation | Component 1 ID | Component 1 % | Component 2 ID | Component 2 % | Component 3 ID | Component 3 % | Coat Weight (lb/3000 ft²) | Peel Strength (g/in) |
|---|---|---|---|---|---|---|---|---|
| 18 | 7 | 55 | 5 | 35 | 10 | 10 | 7.5 | 43.2650 |
| 19 | 7 | 65 | 5 | 25 | 10 | 10 | 7.5 | 473.4515 |
| 21 | 7 | 55 | 1 | 35 | 10 | 10 | 7.3 | 91.1194 |
| 22 | 7 | 65 | 1 | 25 | 10 | 10 | 7.5 | 79.3097 |
| 23 | 7 | 75 | 1 | 15 | 10 | 10 | 7.4 | 220.7462 |
| 24 | 7 | 70 | 5 | 30 |  |  | 7.3 | 70.0187 |
| 27 | 7 | 70 | 1 | 30 |  |  | 7.1 | 57.5373 |
| 31 | 7 | 50 | 2 | 50 |  |  | 7.2 | 188.0037 |
| 32 | 7 | 50 | 9 | 50 |  |  | 6.8 | 53.3955 |

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A method for repeatedly labeling an article, the method comprising applying a reusable liner-less label to an anchoring site permanently affixed to the article,
    wherein the reusable, liner-less label comprises a cling coating on one side,
    wherein the cling coating resists blocking, and comprises an acrylic polymer,
    wherein the acrylic polymer comprises one or more styrene acrylic polymers,
    wherein the anchoring site comprises a cling film comprising polyvinyl chloride, and
    wherein the label attaches to the anchoring site via the cling coating using non-electrostatic cohesive forces.

2. The method of claim 1, wherein the anchoring site comprises an adhesive to permanently affix the anchoring site to the article.

3. The method of claim 1, wherein the anchoring site is permanently affixed to the article after the article is manufactured.

4. The method of claim 1, wherein the anchoring site is introduced into the article during manufacturing of the article.

5. The method of claim 1, wherein the cling film further comprises one or more plasticizers.

6. The method of claim 1, wherein the label is paper.

7. The method of claim 1, wherein the label is polymeric.

8. The method of claim 1, wherein the article is a storage container or a retail shelf.

9. The method of claim 1, wherein the article is packaging material.

10. The method of claim 1, wherein the liner-less label comprises a printable coating or layer on the other side.

11. The method of claim 1, wherein the liner-less label is specific to the anchoring site.

12. A labeling system comprising an anchoring site to be permanently affixed to an article, and one or more reusable, liner-less labels,
    wherein the reusable, liner-less label comprises a cling coating on one side,
    wherein the cling coating resists blocking, and comprises an acrylic polymer,
    wherein the acrylic polymer comprises one or more styrene acrylic polymers,
    wherein the anchoring site comprises a cling film comprising polyvinyl chloride, and wherein the label attaches to the anchoring site via the cling coating using non-electrostatic cohesive forces.

13. The labeling system of claim 12, wherein the anchoring site comprises an adhesive on the other side of the anchoring site to permanently affix the anchoring site to the article.

14. The labeling system of claim 12, wherein the anchoring site is permanently affixed to the article after the article is manufactured.

15. The labeling system of claim 12, wherein the cling film further comprises one or more plasticizers.

16. The labeling system of claim 12, wherein the label is paper.

17. The labeling system of claim 12, wherein the label is polymeric.

18. The labeling system of claim 12, wherein the article is a storage container.

19. The labeling system of claim 12, wherein the article is packaging material.

20. The labeling system of claim 12, wherein the liner-less label comprises a printable coating or layer on the other side.

21. A storage container comprising an anchoring site and a reusable, liner-less label,
    wherein the reusable, liner-less label comprises a cling coating on one side,
    wherein the cling coating resists blocking, and comprises an acrylic polymer,
    wherein the acrylic polymer comprises one or more styrene acrylic polymers,
    wherein the anchoring site comprises a cling film comprising polyvinyl chloride, and wherein the label attaches to the anchoring site via the cling coating using non-electrostatic cohesive forces.

22. A retail shelf comprising an anchoring site and a reusable, liner-less label,
    wherein the reusable, liner-less label comprises a cling coating on one side,
    wherein the cling coating resists blocking, and comprises an acrylic polymer,
    wherein the acrylic polymer comprises one or more styrene acrylic polymers,
    wherein the anchoring site comprises a cling film comprising polyvinyl chloride, and wherein the label attaches to the anchoring site via the cling coating using non-electrostatic cohesive forces.

* * * * *